Aug. 11, 1953
H. R. WENGEN ET AL
2,648,111
CABLE CLAMP
Filed March 30, 1949
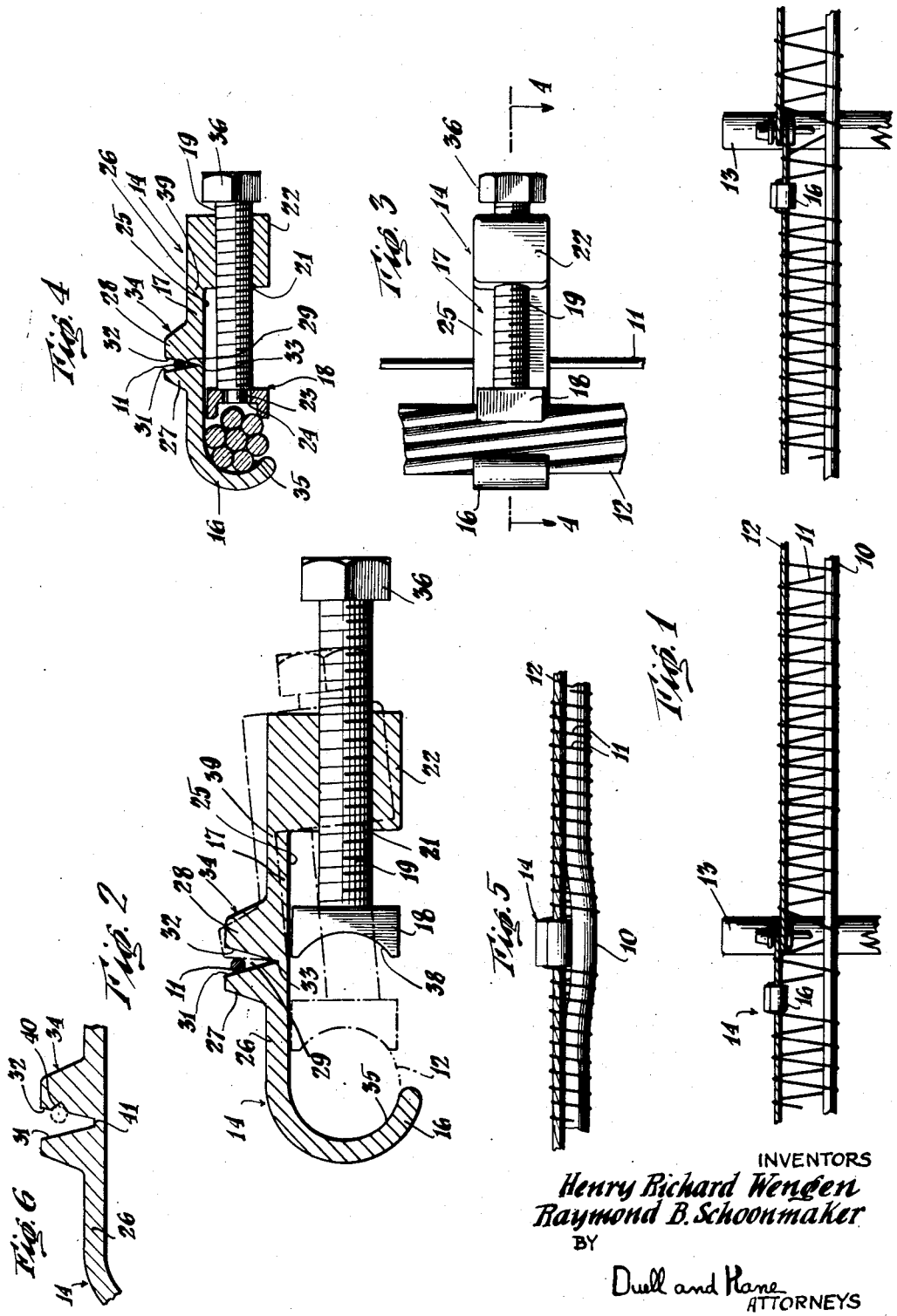
INVENTORS
Henry Richard Wengen
Raymond B. Schoonmaker
BY
Duell and Kane
ATTORNEYS Patented Aug. 11, 1953

2,648,111

UNITED STATES PATENT OFFICE 2,648,111

CABLE CLAMP

Henry Richard Wengen and Raymond B. Schoonmaker, Poughkeepsie, N. Y., assignors to Fargo Mfg. Company, Inc., Poughkeepsie, N. Y., a corporation of New York Application March 30, 1949, Serial No. 84,458

4 Claims. (Cl. 24—81)

This invention relates generally to a clamp for securing together lines, cables or wires and more particularly to a clamp for securing together a cable of relatively large diameter and a wire of relatively small diameter.

It is an object of this invention to provide a clamp for anchoring a wire of small diameter to a wire or cable of much larger diameter.

It is another object of this invention to provide a clamp with which a cable of large diameter and a wire of relatively small diameter can be clamped and secured together at the same time and by a single operation.

It is a further object of this invention to provide a clamp for the support of aerial cables such as telephone and power cables which will clamp the messenger cable and the lashing wire at the same time and by a single operation.

It is still another object of this invention to provide a lashing wire clamp which may be applied to a messenger cable by a single operation and which will clamp and secure the lashing wire by the same act of clamping the clamp on the messenger cable.

It is yet another object of this invention to provide a messenger and lashing wire clamp which can be manufactured at low cost and will accommodate various sizes of messenger, and various sizes of lashing wire.

A further object is that of providing a unit which will embody relatively few parts, each of simple, rugged construction, such parts being capable of economical manufacture and assemblage by relatively unskilled labor to furnish a unitary article operating over long periods of time with freedom from all difficulties.

With these and other objects in mind, reference is had to the attached sheet of drawings illustrating a practical embodiment of the invention and in which:

Fig. 1 is a schematic view of a messsenger cable supporting an aerial cable between spaced poles by means of a lashing wire secured by the present invention;

Fig. 2 is a side elevation of a clamp of this invention shown in the open position in full lines and in the closed position in dotted lines;

Fig. 3 is a bottom plan view of the lashing wire clamp with the messenger and the lashing wire in place;

Fig. 4 is a side elevation in section taken along line 4—4 of Fig. 3 in the direction of the arrows;

Fig. 5 is an elevation of a modified means of lashing an aerial cable to a messenger cable employing the clamp of this invention; and Fig. 6 is a side elevation of a portion of a modified clamp of this invention.

In general, the clamp of this invention comprises a large clamp provided with a stationary jaw, a movable jaw, a bed across which the movable jaw moves, a lug in which the means for moving the movable jaw is supported and a second smaller clamp formed on the back of the clamp. The second small clamp on the back of the first large clamp is formed by cutting a groove into the back of the clamp, which groove weakens the clamp at this point and permits the second clamp to be closed by bending the back of the clamp when the jaw-closing means supported in the lug exerts a force on the weakened area as the first large clamp is tightened upon the messenger cable wire.

Referring to Fig. 1, an aerial cable 10 is supported by a lashing wire 11 on a messenger cable 12. The messenger cable 12 in turn is supported on poles or towers 13. The lashing wire 11 is secured in place on the messenger wire by clamps 14 which grip both the messenger cable 12 and the lashing wire 11.

The clamp 14 secures the lashing wire 11 to the messenger cable 12 by first clamping the messenger cable 12 and, as shown in Fig. 2, as the clamp is tightened on the messenger cable 12, bending to the closed position in which it grips the lashing wire 11. Referring to Fig. 3 to demonstrate the position of the parts of the clamp 14 in cable-gripping position, a rigid jaw 16 and a central portion 17 are shown associated with a movable jaw 18 which is moved across the central portion 17 by a suitable screw 19. As shown in Fig. 4, the screw 19 is supported in a tapped passage 21 extending through a thick lug 22 at the end of the clamp opposite the stationary jaw 16, said lug 22 being integral with central portion 17 and stationary jaw 16. The movable jaw 18 is carried on the end of the screw 19 by a pivot point 23 which sets in a socket 24 in the center of the movable jaw 18. The central portion 17 of the clamp 14 has an inner surface 25 upon which the movable jaw slides and an outer surface 26 which forms the outside or upper part of the clamp as shown in the figures. Upon this outer or upper surface 26 are raised two lugs 27 and 28 which are integral with the central portion 17, the lug 22, and the jaw 16, and composed of the same material. Consequently, stationary jaw 16, lugs 27, 28 and lug 22 are formed from a single piece of material and are integral with each other. The lugs 27 and 28 are separated by a V-shaped groove 29 which has walls 31 and 32 terminating in an apex 33 to form the lugs into a small clamp which, for the purposes of this description, will be referred to as a vise 34.

The vise 34 therefor is positioned on and in the surface 26 of the main clamp 14. The central portion 17 of the clamp is weakened in the area of the vise 34 by the V-shaped groove 29 as the thinnest portion of the central portion is the section between the apex 33 and the inner surface 25. On the other hand, the curved structure of the stationary jaw 16 and the thick dimension of the lug 22 provide the clamp 14 with strength and rigidity, which is relatively great as compared to the thin portion of the central portion in the region of the V-shaped groove 29.

Clamps of this nature are operated generally only the once, that is, when they are applied to the cable and lashing wire. It is therefore not necessary to provide for frequent opening and closing of the clamp. In applying the clamp of this invention to a messenger cable and lashing wire, the messenger cable 12 is lain inside on arcuate surface 35 of the rigid jaw 16 and the lashing wire 11 is inserted in the groove 29. Head 36 on the screw 19 is then turned to thread the screw 19 through the tapped passage 21 and moving the movable jaw 18 across the inner surface 25 of the central portion 17 causes an arcuate surface 38 of the movable jaw 18 to contact the messenger cable. As the movable jaw 18 is clamped on to the cable 12, resistance to the compression of the cable by the sturdy structure of the twisted wire that the messenger cable is generally composed of exerts a back compression against the threads in the tapped passage 21. This back pressure against the threads in the passage 21 is applied to a lever 39 which is made up of the lug 22 and that part of the clamp 14 adjacent the lug 22. The back pressure on the lever 39 moves the lug 22 in a counterclockwise direction as seen in Fig. 2. The lever 39 turns about a fulcrum point at the apex 33 of the groove 29. By composing the clamp of brass or some other relatively malleable material it is possible to cause the central portion 17 of the clamp to bend or hinge on the fulcrum point at apex 33 in a counterclockwise direction as seen in Fig. 2. Such a motion, which is exaggerated in the showing in Fig. 2, moves the wall 32 toward the wall 31, narrows the groove 29, and grips the lashing wire 11 tightly in the groove 29.

The more the screw 19 and the jaw 18 are tightened on the cable 12 the greater will be the back pressure on lug 22 and the lever arm 39. The walls 31 and 32 of the vise 34 are closed on the wire 11 by distortion of the clamp 14 by bending of the central portion 17. The clamp 14 is composed of a malleable material, such as malleable iron, brass, or other malleable metal. With the clamping action the malleable material becomes deformed, holding the wire 11 in the vise 34 until the walls 31 and 32 are forced apart by jamming a screw driver or similar instrument into the groove 29 and reversing the action of the lever 39, by bending the central portion 17 in the opposite direction around apex 33.

In the operation of the clamp of this invention, a lineman in using the clamp runs the lashing wire through the groove 29 and either immediately before or immediately afterwards, hooks the jaw 16 over the messenger wire 12, and while holding the clamp 14, the messenger cable 12, and the lashing wire 11 in position with one hand, has a free hand to turn head 36 until clamp 14 securely grips the cable 12 and the lashing wire 11 is jammed in the vise 34. The clamping operation is then complete. It will thus be seen that one of the advantages of this invention is the simplicity both of applying the clamp to the messenger cable and the lashing wire and the ease of applying the clamping pressure. Another advantage of the invention is the interrelation between the clamping of the messenger cable and the lashing wire so that the operation of clamping one simultaneously performs the operation of clamping the other. Still another advantage of this invention is the minimum of moving parts employed which provides a clamp of inexpensive, rigid construction.

Further advantages of this invention are the simplicity of construction, the economical manufacture and assemblage possible in making such parts and the fewness of the number of parts necessary. Still further advantages are found in the simplicity of attaching the connected line, the fool-proof nature of the connection made, and the reliability of its operation.

It will be apparent that various modifications may be made in the arrangement of the parts of the clamp of this invention without departing from the principles or altering its operation. In Fig. 5 a modification is shown in the manner of supporting the cable 10 on the messenger 12. In this modification the lashing wire 11 is closely wrapped and holds the cable 10 closely adjacent to the messenger 12 and the messenger wire clamp 14. In Fig. 6 a modification is shown of the V-shaped groove 29. A transverse notch 40 is cut laterally into wall 32. At the bottom of the groove 29 walls 31 and 32 end in a flat bottom 41. As another modification, the screw 19 may issue from the tapped passage 21 substantially parallel with the surface 25 and still obtain a lever action on the fulcrum of the apex 33. Likewise, the V-shaped groove may terminate in a relatively broad bottom and need not be cut to a deep V-point as long as the clamp is weakest in the region of the V-groove and the lashing wire does not seat in the bottom of the groove but is retained on the walls of the groove an appreciable distance from the bottom of the groove so that the turning of the wall on the lever fulcrum will have a greater effect on clamping the wire than if it were seated directly on the bottom of the groove.

Thus, among others, the several objects of the invention as specifically aforenoted are achieved. Obviously numerous changes in construction and rearrangement of the parts may be resorted to without departing from the spirit of the invention as defined by the claims.

We claim:

1. A clamp for clamping two wires simultaneously having a central portion, a first jaw projecting laterally from one side of said central portion, a first set of jaws formed in the opposite side of said central portion having opposite faces extending transversely into said central portion, a thin portion of said central portion weakening the structural strength of said portion adjacent said jaws, a supporting member formed integrally on said central portion extending laterally therefrom on the same side as said first jaw at a point on said central portion removed therefrom, a movable jaw cooperable with said first jaw to provide a second set of clamping jaws, and means for operating said movable jaw mounted in said supporting member whereby said movable jaw is brought into cooperation with said first jaw to provide a clamping action and a resultant back pressure exerted on the supporting member causes a bending in said thin portion to close said pair of jaws.

2. In a clamping device having two sets of clamping jaws operated by a common movement, the combination of a unitary member composed of a first jaw projecting from a first side thereof, a pair of jaws formed in the unitary member on the second and opposite side from said first jaw to provide a first set of clamping jaws, a thin portion weakening said unitary member in an area adjacent said first set of jaws and a supporting member extending from said unitary member on said first side thereof; a movable jaw operable to cooperate with said first jaw and provide a second set of clamping jaws therewith and jaw-closing means mounted in said supporting member whereby said movable jaw is closed on said first jaw to provide a clamping pressure and a resultant back pressure on said support arm applies pressure on said thin portion through said unitary member to operate said first set of clamping jaws.

3. A clamp for securing together a cable or wire of relatively large circumference and a wire of relatively small circumference having a first clamp for clamping said large cable and a second clamp for clamping said wire, the combination of a unitary member composed of a central portion, a first stationary jaw projecting from a first side of said central portion, a supporting member projecting from said first side of said central portion at a point removed from said first stationary jaw; a movable jaw positioned between said first stationary jaw and said supporting member cooperable with said first stationary jaw to provide said first clamp; means for actuating said movable jaw mounted on said supporting member, a second pair of jaws formed in the opposite side of said central member to provide said second clamp; a groove in said central portion between said pair of jaws, a thin portion of said central portion adjacent said groove and a lever formed in said unitary member between said thin portion and said supporting member turning on said thin portion as a fulcrum point whereby back pressure exerted on said supporting member by said actuating means upon closing said first clamp applies a force on said lever turning on the fulcrum point of said thin portion to close said second clamp.

4. In a clamp as claimed in claim 3, an actuating means having a first position in which said first clamp is engageable with a wire and a second position in which said first clamp is engageable with a wire and said second clamp is engageable with a wire.

HENRY RICHARD WENGEN.
RAYMOND B. SCHOONMAKER.

References Cited in the file of this patent

UNITED STATES PATENTS

| Number | Name | Date |
|---|---|---|
| 1,677,376 | Zilliox | July 17, 1928 |
| 2,295,051 | Roth | Sept. 8, 1942 |

FOREIGN PATENTS

| Number | Country | Date |
|---|---|---|
| 715,432 | France | Sept. 28, 1931 |